(No Model.)
C. E. WEBER.
COMBINATION BOLT AND WASHER.
No. 462,752.            Patented Nov. 10, 1891.
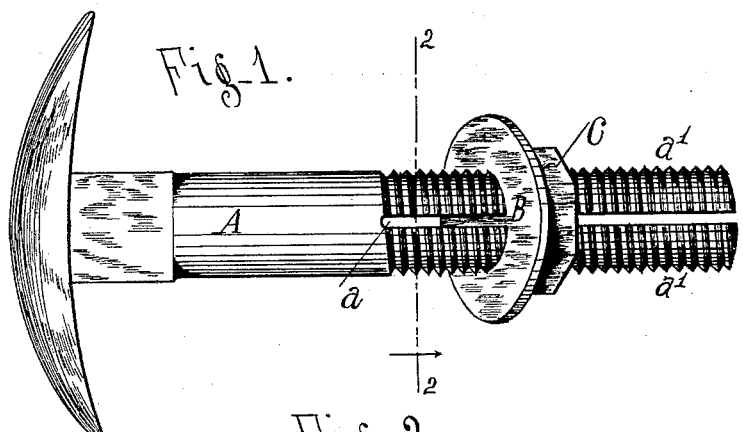
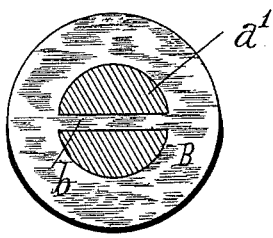
Witnesses.
Alex. B. DuBois.
Eben Howells
Inventor.
Charles E. Weber,
by N. DuBois his Atty.

UNITED STATES PATENT OFFICE.

CHARLES E. WEBER, OF SPRINGFIELD, ILLINOIS, ASSIGNOR OF ONE-HALF TO JOSEPH SCHNEIDER.

COMBINATION BOLT AND WASHER.

SPECIFICATION forming part of Letters Patent No. 462,752, dated November 10, 1891.

Application filed February 28, 1891. Serial No. 383,314. (No model.)

*To all whom it may concern:*

Be it known that I, CHARLES E. WEBER, a citizen of the United States, residing at Springfield, in the county of Sangamon, State of Illinois, have invented a new and useful Combination Bolt and Washer, of which the following is a specification.

My invention relates particularly to bolts and washers for use as king-bolts, T-bolts, top-prop bolts for vehicles, and other machinery bolts.

The purpose of my invention is to provide simple and effective means to prevent the washer from turning independently of the bolt, thereby loosening the tap on the bolt. This I accomplish by the mechanism shown in the accompanying drawings, of which—

Figure 1 is a side view of a T-bolt embodying my invention. Fig. 2 is a section on the line 2, and shows the washer in position on the bolt.

Similar letters in both figures indicate the same parts.

The bolt A is of ordinary construction, except that the threaded portion of the bolt has a longitudinal saw-cut $a$, dividing the bolt into two prongs $a'$. The washer B may be circular, as shown, or of any other convenient form, and is formed so as to leave on either side of the transverse integral bar $b$ openings, through each of which one prong $a'$ of the bolt passes, and when the washer is in position on the bolt the transverse bar $b$ lies in the slot $a$ and prevents the washer from turning independently of the bolt. The tap C is of ordinary construction, and screws up close against the washer, binding both closely together. It is obvious that the bolt and washer being interlocked neither the washer nor the bolt can turn to loosen the tap.

What I claim is—

1. In a combination bolt and washer, the bolt A, having a longitudinal saw-cut $a$ and parallel threaded prongs $a'$, in combination with a washer B, having a transverse bar $b$, substantially as shown and described, and for the purpose stated.

2. In a combination bolt and washer, a washer consisting of a disk or plate B, having perforations and an integral transverse bar $b$, in combination with the tap C and bolt having a longitudinal saw-cut $a$ and parallel threaded prongs $a'$, substantially as shown and described, and for the purpose stated.

3. As a new article of manufacture, a combination bolt and washer consisting of a bolt A, having a longitudinal saw-cut $a$ and parallel threaded prongs $a'$, a washer having perforations and an integral transverse bar $b$, and a tap C, substantially as shown and described, and for the purpose stated.

CHARLES E. WEBER.

Witnesses:
F. BLAKESLEY,
F. N. BURTS.